E. H. SEIBERT.
CRUTCH TIP.
APPLICATION FILED JUNE 15, 1908.

909,827.

Patented Jan. 12, 1909.

WITNESSES.
W. C. Stein
L. A. L. McIntyre

INVENTOR
Edward H. Seibert
by Hopkins & Eicks, Attys

UNITED STATES PATENT OFFICE.

EDWARD H. SEIBERT, OF ST. LOUIS, MISSOURI.

CRUTCH-TIP.

No. 909,827.   Specification of Letters Patent.   Patented Jan. 12, 1909.

Application filed June 15, 1908. Serial No. 438,672.

*To all whom it may concern:*

Be it known that I, EDWARD H. SEIBERT, a citizen of the United States, and resident of St. Louis, Missouri, have invented certain new and useful Improvements in Crutch-Tips, of which the following is a specification.

My invention relates to improvements in crutch tips, and has for its object to provide a tip or terminal member for a crutch, having two resilient members connected by an inflexible member, the faces of the resilient members being separated by an interposed metallic anti-friction member to facilitate the rotation of the lower resilient member.

Figure 1:
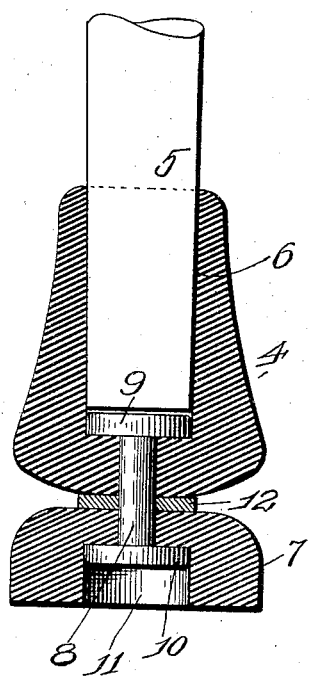
Figure 2:
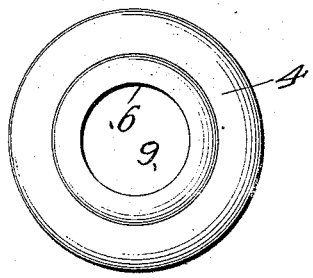
Figure 3:
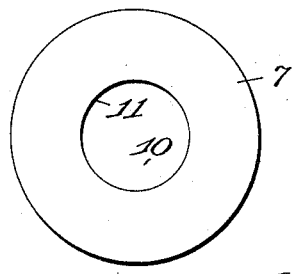

In the drawings—Figure 1 is a vertical sectional view of a device embodying my invention. Fig. 2 is a top plan view of the same. Fig. 3 is a bottom plan view of the same.

As shown in the drawings, I employ a resilient ferruled member 4 adapted to seat closely upon the lower end of a crutch 5, being provided with the cylindrical opening 6 for that purpose. A lower resilient member 7 is connected to the member 4 by means of the pin 8, which is provided with the head 9 seated in the opening 6 in the member 4, and the head 10 seated in the circular pocket 11 with which the lower member 7 is provided.

Surrounding the pin 8 I provide the metallic member 12, preferably of disk shape. The function of the metallic member 12 is to prevent the excessive friction which would otherwise be created between the resilient members 4 and 7 in the use of the crutch tip; it being necessary for the resilient member 7 to rotate with reference to the member 4 when placed upon the surface of the floor or street in use. The base of the terminal 5 of the crutch in use will contact with the head 9 with which the pin 8 is provided, thus forcing the pin 8 and the lower head 10 downwardly within the pocket 11, but not to an extent which will contact with the floor-or-street surface.

By means of the structure which I have described, the user of the crutch is not subjected to the shock or jar which occurs in the use of the crutch tip in which metal is permitted to contact with metal, or in which lower and upper members are employed which are permitted to occlude with each other; such occlusion creating a high degree of friction where a lower member of rubber or other resilient material is permitted to contact with an upper member of like material. The weight of the user of the crutch being exerted upon the upper resilient member 4, and the lower member 7 occluding with the floor-or-street surface, when the user takes a forward or backward step, a swiveling or rotary movement occurs between said resilient members, and a high degree of friction is created, proportionate to the weight of the user of the crutch. To overcome this friction, the metallic member 12 is interposed between said resilient members 4 and 7.

Another advantage of the crutch tip of my invention resides in the fact that upon the lower member 7 being worn to a point which will permit the pin head 10 to contact with the floor-or-street surface when the crutch is in use, such lower member 7 is removed by cutting the pin 8, substituting a new member 7, and replacing the pin 8 with its heads 9 and 10 as before. Thus the smaller and cheaper member 7 may be worn out and replaced indefinitely, affording great economy in the use of the crutch tip.

Having fully described my invention, what I claim as new and desire to have secured to me by the grant of Letters Patent, is:

In a crutch tip, the combination of an upper resilient member provided with a cylindrical opening adapted to receive the lower terminal of a crutch; a lower resilient member provided with a circular pocket; a pin connecting said members and having heads seated within the openings in said members; and a metallic member mounted around said pin and between the adjacent faces of said resilient members, substantially as described.

In testimony whereof, I have signed my name to this specification, in presence of two subscribing witnesses.

EDWARD H. SEIBERT.

Witnesses:
ALFRED A. EICKS,
WALTER C. STEIN.